Figure 1:
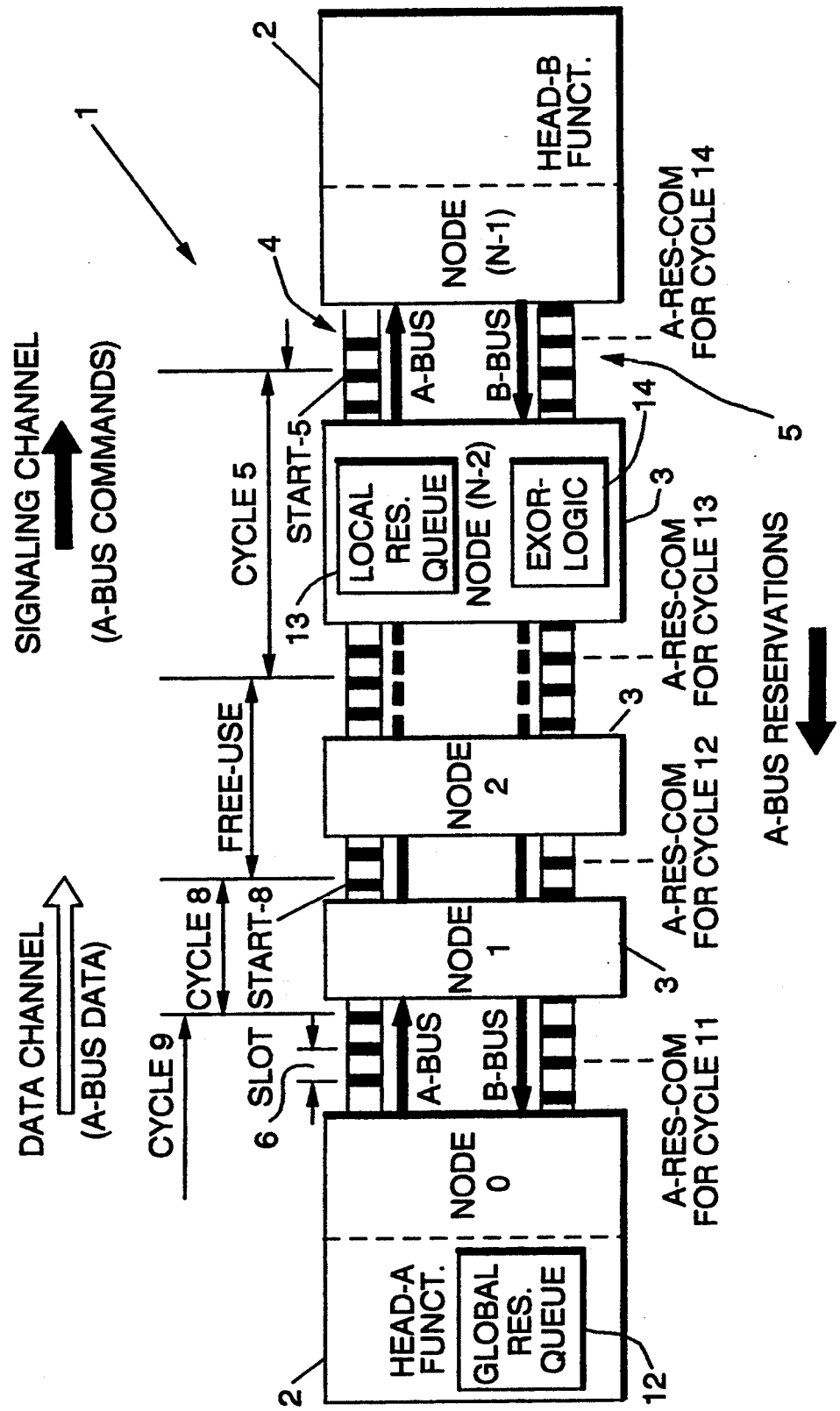

United States Patent [19]

Heinzmann et al.

[11] Patent Number: 5,337,312
[45] Date of Patent: Aug. 9, 1994

[54] COMMUNICATIONS NETWORK AND METHOD OF REGULATING ACCESS TO THE BUSSES IN SAID NETWORK

[75] Inventors: Peter L. Heinzmann, Windlach; Johann R. Mueller, Langnau am Albis; Mehdi M. Nassehi, Horgen, all of Switzerland

[73] Assignee: International Business Machines Corporation, Armonk, N.Y.

[21] Appl. No.: 722,461

[22] Filed: Jun. 27, 1991

[30] Foreign Application Priority Data

Mar. 15, 1991 [EP] European Pat. Off. ......... 91810171.8

[51] Int. Cl.[5] .............................................. H04J 3/02
[52] U.S. Cl. ................................. 370/85.9; 370/85.11; 340/825.52
[58] Field of Search ................. 370/85.7, 85.8, 85.9, 370/85.11, 95.1, 95.2, 85.1, 94.1, 85.6, 85.2, 95.3; 340/825.08, 825.07, 825.05, 825.52, 825.5

[56] References Cited

U.S. PATENT DOCUMENTS

| | | | |
|---|---|---|---|
| 4,586,175 | 4/1986 | Bedard et al. | 370/58.9 |
| 4,679,192 | 7/1987 | Vanbrabant | 370/85.11 |
| 4,922,244 | 5/1990 | Hullett et al. | 370/85.11 |
| 4,977,557 | 12/1990 | Phung et al. | 370/85.9 |
| 5,001,707 | 3/1991 | Kasitpaiboon et al. | 370/85.11 |
| 5,082,622 | 1/1992 | Nassehi et al. | 370/85.11 |
| 5,115,430 | 5/1992 | Hahne et al. | 370/85.11 |

*Primary Examiner*—Douglas W. Olms
*Assistant Examiner*—Chau T. Nguyen
*Attorney, Agent, or Firm*—J. G. Cockburn

[57] ABSTRACT

There is provided a method of regulating access to a unidirectional bus transmission system to which a plurality of stations identified by labels are connected, on which system data are transmitted in time slots which are released in numbered cycles by a headend unit, and in which said headend unit sends, for each of said cycles, a request poll message carrying the respective cycle number. The method comprises i) logically combining a source station label and a destination station label, ii) deriving a first control number from the logical combination of the source station label and the destination station label, iii) using, for requesting slots in which to transmit said data, a request poll message carrying a cycle number which corresponds to said first control number, and iv) subsequently transmitting said data in slots of a cycle whose number corresponds to said first control number.

10 Claims, 7 Drawing Sheets

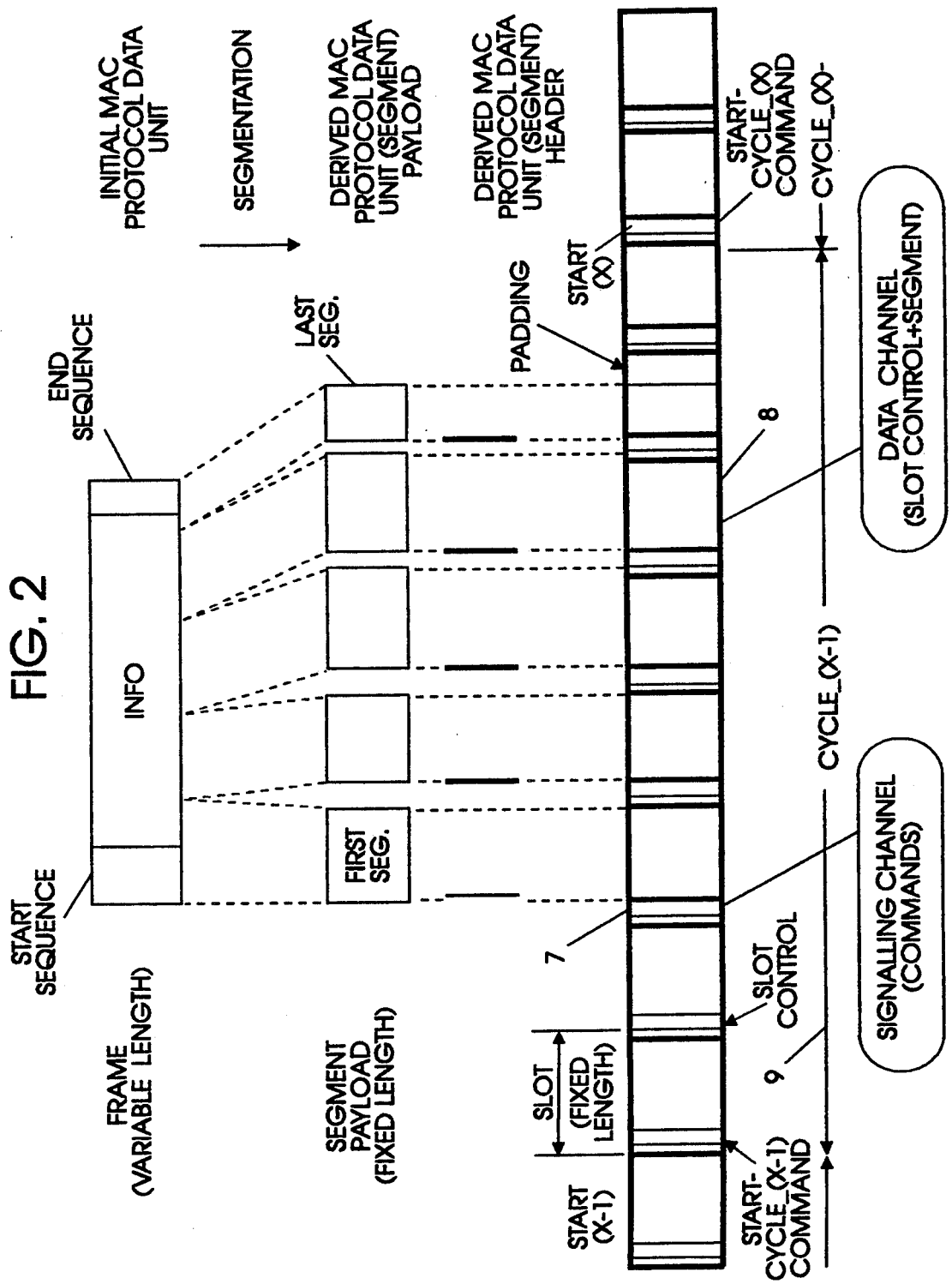

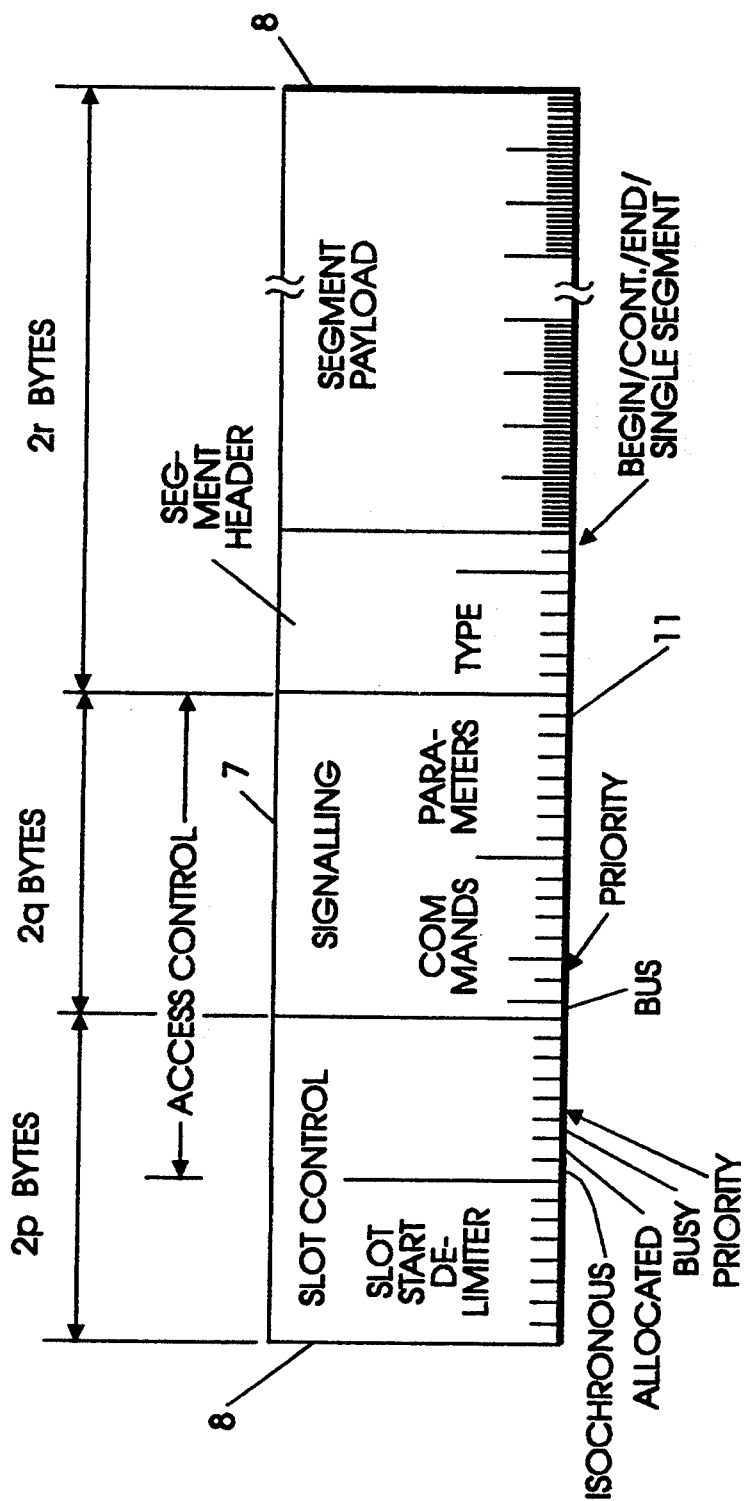

FIG. 4B

| START<br>(BUS, PRI, CYC-NUM) | BUS | PRIO | STA | CYC-NUM |

| CONFIRM<br>(BUS, PRI, CYC-NUM) | BUS | PRIO | CON | CYC-NUM |

| REJECT<br>(BUS, PRI, CYC-NUM) | BUS | PRIO | REJ | UNUSED |

| LABEL | BUS | PRIO | LAB | LAB-NUM |

WAIT
CLEAR/RESET
NOOP
LATENCY

COMMUNICATIONS NETWORK AND METHOD OF REGULATING ACCESS TO THE BUSSES IN SAID NETWORK

The present invention relates to a communications network comprising two uni-directional and counterflowing busses, and to a method of regulating access to said busses.

Several kinds of networks are known in which plural nodes or stations gain access to a common transmission medium. Examples of such systems are single bus networks with collision detection, and token ring networks as well as token passing bus networks. Recently, networks providing another technique of multiple access to a common transmission medium have become of interest. These are systems comprising two parallel busses with counterflowing transmission of information on the two busses. Slots are released at regular intervals by headend stations, and these slots are used by the node stations for data transmission. Each node station has to request access to a slot by previously transmitting an access request in an Access Control Field of a passing slot. It keeps a count of access requests it has seen from other stations (located upstream in request transmission direction) before it raises its own access request, and lets as many free slots pass by (for use by the other stations) as the count indicated, before it occupies the next free slot for transmission of its own data.

Such systems were described e.g. in a paper by R. M. Newman et al. entitled "The QPSX MAN", published in the IEEE Communications Magazine, Vol. 26 No. 4 (April 1988) pp. 20–28; and in a Proposed Standard by IEEE 802.6 entitled "Distributed Queue Dual Bus (DQDB) Subnetwork of a Metropolitan Area Network (MAN)", Draft D14, Jul. 13, 1990.

Though these known distributed queueing systems are well suited for networks comprising a limited number of stations, they have some disadvantages which become unacceptable and may render the system inefficient when the number of stations is raised to several hundred, and when the length of the transmission busses is in the order of several kilometers.

These disadvantages are in particular: An "unfairness" for some stations with respect to others, due to the fact that each station has to await a free access request field before it can transmit a request, so that stations located upstream (in request transmission direction) are preferred: and an impossibility to guarantee the availability of a sequence of consecutive slots for one station desiring to transmit the portions of a data packet without interruption.

In an article by S. B. Calo et al.: "Poll Actuated Multiple Access Technique for Broadgathering Systems", IBM Technical Disclosure Bulletin, Vol. 30, No. 1 (June 1987) pp. 72–75, a dual bus system is disclosed which has a plurality of stations connected between the busses. For controlling access to the busses, a pacer is provided at one end and a poller at the other end of the network. The pacing element partitions the time into contiguous slots which can be used by stations for data transmission. The polling element imposes a frame cycle structure by starting operation cycles. Each station can use only a limited number of slots in any cycle.

This method avoids the possibility that particular stations because of their topological situation can dominate the system (not leaving free slots for other stations). However, it has also disadvantages. As the allowed number of slots for each station is fixed or determined by central administration, situations may often occur that in a cycle a heavily active station cannot transmit as many slots as required, whereas momentarily silent stations will not use any slots of a cycle. This will result in a non-optimum utilization of the transmission network.

An access scheme for Gbit/s LAN and MAN bus systems, offering high throughput efficiency and fairness independent of the network speed or distance, is known from EP-0 393 293 (IBM). This scheme is referred to as Cyclic-Reservation Multiple- Access (CRMA). According to this scheme nodes reserve consecutive slots of a cycle for transmitting their packets, thus facilitating packet reassembly.

In CRMA each slot is productively used only for a portion of its passage along the bus, i.e. between the source node and the destination node. A modification to CRMA, called order-pad-passing or Cyclic-Reservation Multiple-Access with Slot-Reuse (CRMA/SR), is known from EP-application No. 90810294.0 (IBM). The invention according to said EP-application allows reuse of slots after they have reached their destinations.

This is achieved by gathering more detailed control information. Order pads are issued at each headend unit in the network, and each node is allowed to reset the "requested length" parameter in the passing order pads, if all requested time slots have reached their destination before they arrive at the node in question.

The technique for cyclic-reservation multiple access (CRMA) with slot reuse, proposed in EP-application No. 90810294.0 allows for significant increase in network capacity and reduced access delay under high load without giving up the basic CRMA advantages. This is achieved by introducing more intelligence in the order pad passing process, making use of the fact that slots which have reached their destinations at a certain node could be overwritten i.e., reused by other (downstream) nodes. For that purpose each node is allowed to reset the "requested length" parameter of the order pad to zero, whenever it is guaranteed that all requested slots (i.e. the segment payloads they contain) will have reached their destination upon arrival at this node. Hence, the reservation process can restart as if the order pad was issued by a headend, leading to an overall cycle length which is much shorter than in basic CRMA, i.e. the capacity increases and the access delay is reduced.

In order to decide whether the slots will have reached their destinations, "node labels" which indicate the node positions along the bus must be introduced and some information about the destinations of the requested slots must be included in the order pad command. Furthermore, an indication about the reuse possibility in the data transmission process must be added to the Local Reservation Queues (to be explained later in more detail in connection with FIG.7). The Global Reservation Queue is not changed.

The order pad command for CRMA with slot reuse (CRMA/SR) contains now three parameters which are processed at the nodes. The "Requested Length" (REQ-LEN) parameter is similar to the same parameter in basic CRMA, except that it contains the accumulated number of ordered slots since its last reset to zero. The "Requested Maximum" (REQ-MAX) parameter saves the absolute maximum of the Requested Length within that cycle. It is initially set to zero and updated by each node whenever the accumulated Requested Length is larger than the current value of Requested Maximum.

The "Destination Maximum" (DST-MAX) holds the node label of the most downstream destination of the already requested slots.

However, CRMA/SR is efficient only in situations with localized traffic. A single request for transmission from the first to the last node of the bus, e.g. a broadcast message, inhibits the reuse of any slots in the corresponding cycle.

Adaptive polling or probing, which is disclosed in J. F. Hayes, "An adaptive technique for local distribution," IEEE Trans. Commun., Vol.COM-26, August 1978 is a polling scheme based on the tree-search algorithm. More specifically, a central controller polls the nodes for packets according to a round-robin discipline. In order to minimize the polling overhead, groups of nodes are asked if any of them has a packet. In a given round, first the controller asks all nodes. If there is a positive response, the nodes are partitioned into two subgroups according to the prefix of their binary labels. The procedure is repeated for each subgroup until the nodes which have a packet are identified.

The method according to the present invention is termed Scheduled Cyclic-Reservation Multiple-Access (S-CRMA), The proposed partitioning for S-CRMA is significantly different from the partitioning scheme in the adaptive polling. First, the adaptive polling partitioning is based on addresses of the source nodes only, while in S-CRMA it is based on both source and destination addresses. Secondly, in S-CRMA the partitioning does not require a response from the nodes.

The network and method according to the present invention achieves more efficient slot usage under arbitrary traffic patterns. It requires only minor modifications in the CRMA protocol. There is no information about upstream nodes required, so that the reservations for one bus can be placed on the opposite bus, which gives better delay performance. It provides slot reuse, requiring just one additional parameter in the reservation command that indicates the maximum number of requested slots for that cycle.

The above advantages are achieved with a communications network as claimed in claim 1, and with a method of regulating access to the busses of said network, as claimed in claim 6. Preferred embodiments of the invention are brought out in the dependent claims.

Figure 4A:
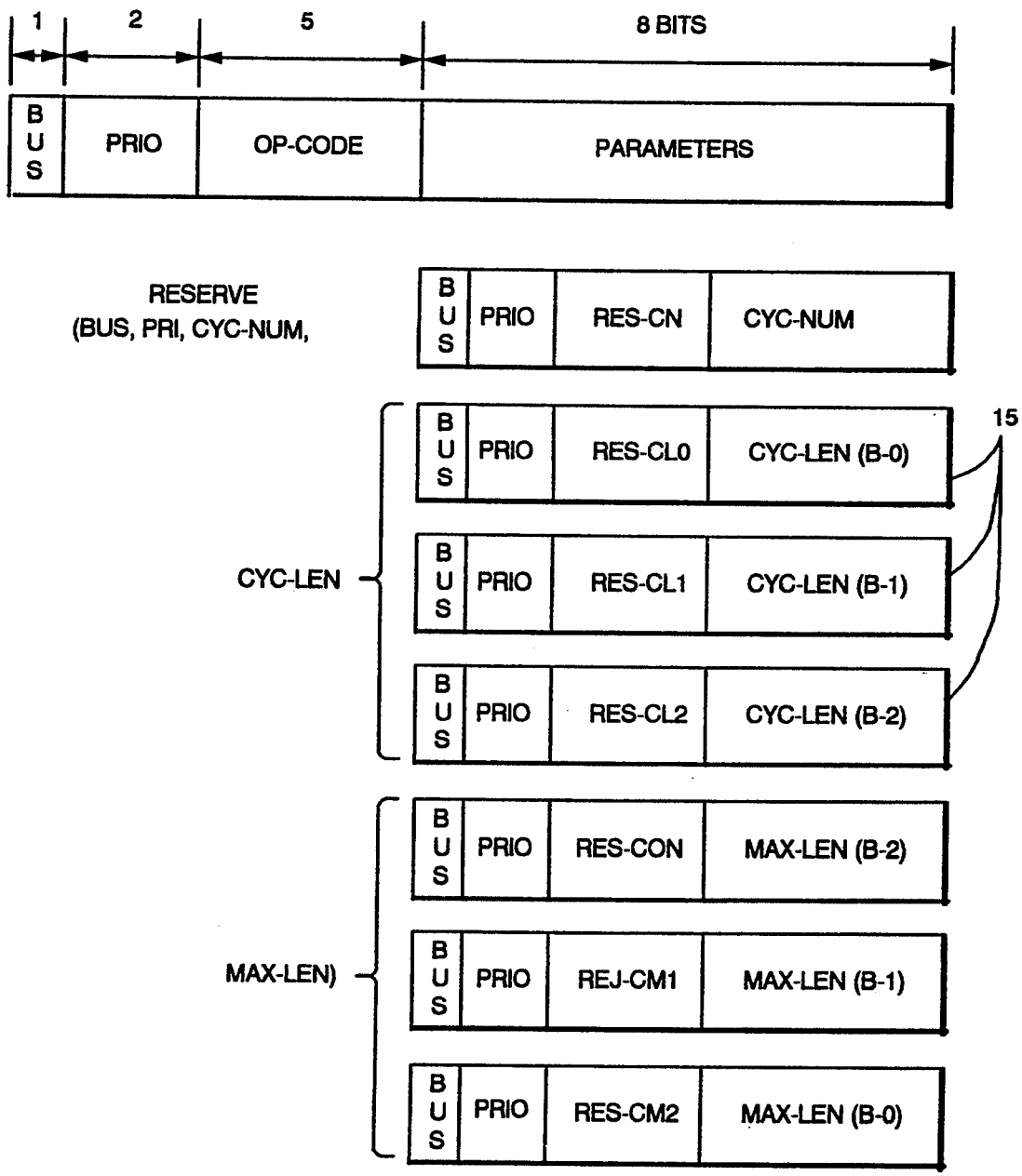
Figure 5:
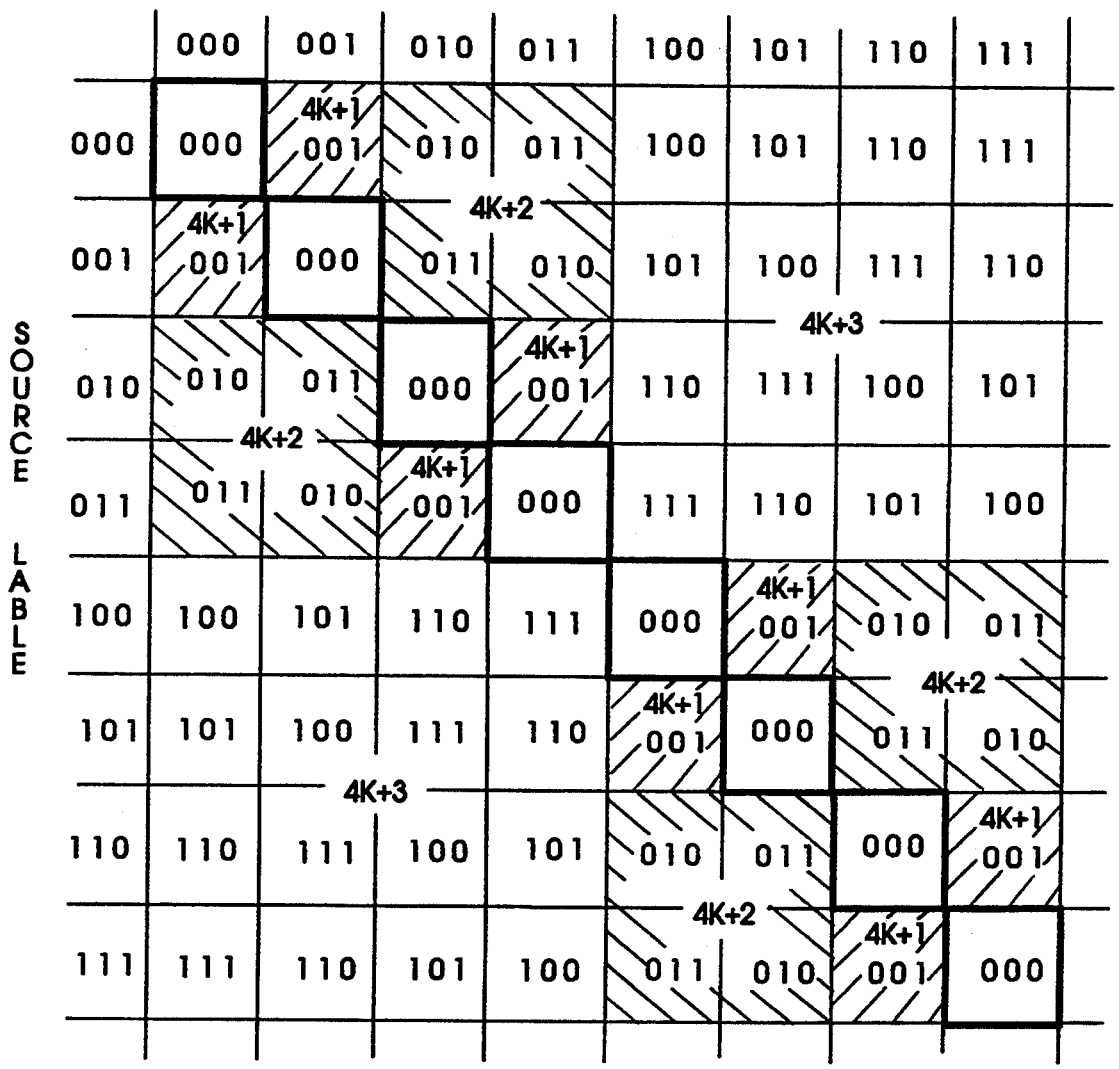
Figure 6:
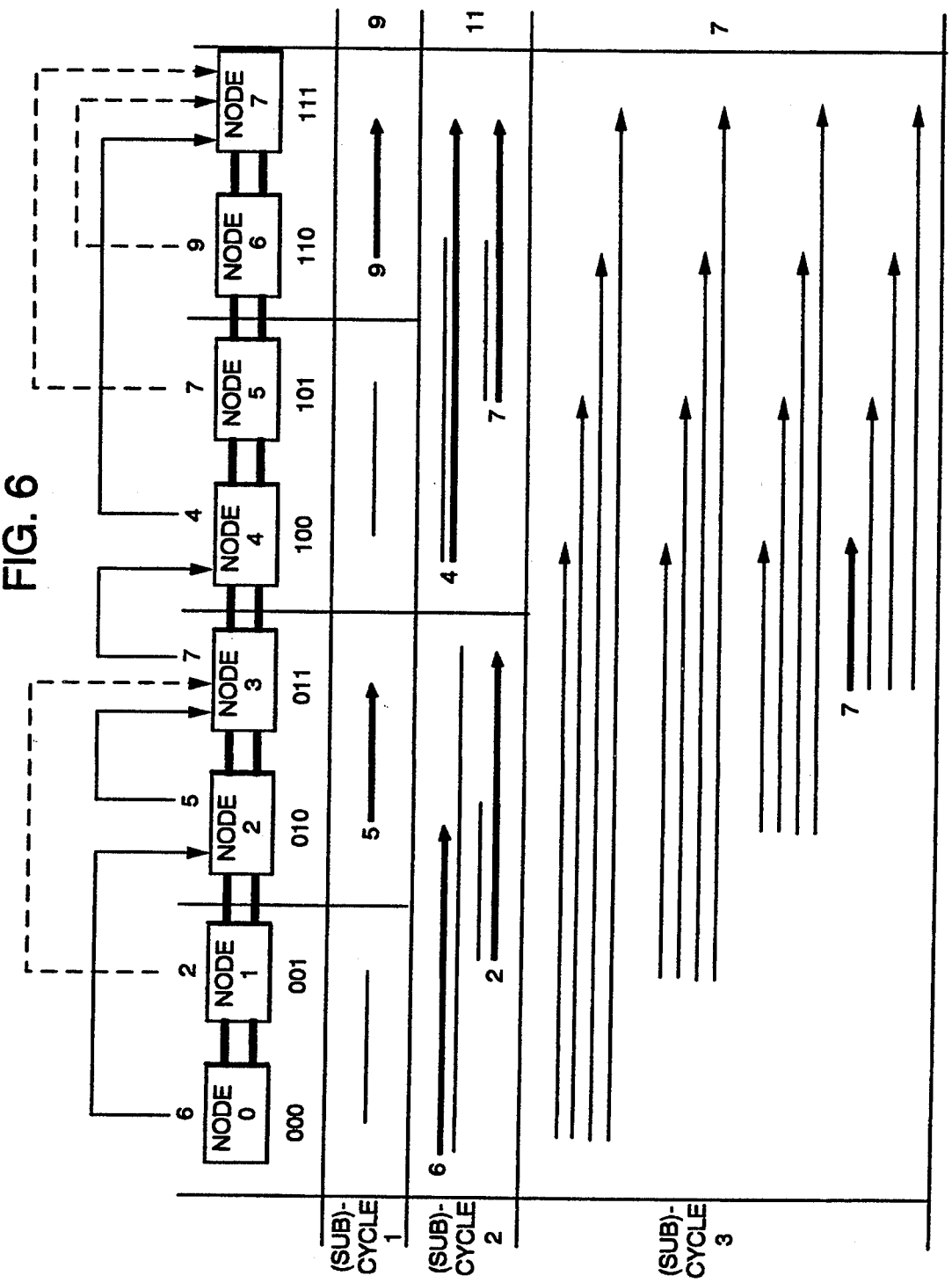

Below a detailed description of the cycle structure, the reservation process and of a preferred embodiment of the invention will be given with reference to the drawings, in which FIG. 1 shows the network layout, FIG. 2 shows the frame segmentation scheme, FIG. 3 is an illustration of the slot format, FIG. 4A and 4B illustrate the S-CRMA command format, FIG. 5 shows the partitioning of the data over subcycles, and FIG. 6 shows the scheduling according to the invention for a specific traffic pattern.

The network 1 and method according to the invention (S-CRMA), is an implementation of an access scheme for dual-bus networks where transmission is organized in time slots 6 grouped into cycles 9.

A headend unit 2 in the network issues Reserve commands (or request poll messages). The format of such commands is shown in FIG. 4.

Each slot 6 is subdivided providing a signalling channel 7 carrying commands, and an (independent) data channel 8 that is used to transmit the user data. A node or station 3 that wants to transmit user data, i.e. a frame, breaks up the frame into a number of fixed length segments and adds some segment header information. It then places a reservation for the required number of slots of a certain cycle on the signalling channel 7. When the reservation has been confirmed and the corresponding cycle has started, the node can utilize the requested number of slots for the transmission of its frame (see FIG. 2).

S-CRMA works on networks that have logically two buses 4, 5, denoted A-bus 4 and B-bus 5 and the nodes (or stations) transmit and receive on both buses. The A-bus is used if the destination is located downstream, otherwise the data is transmitted on the B-bus. The terms upstream and downstream will always be used in reference to the A-bus. The nodes 3 are labeled linearly from 0 to N-1. Label assignment takes place at network initialization and after configuration changes using a process similar to the one described in EP-application No. 90810294.0 (IBM), P. L. Heinzmann, H. R. Müller, M. M. Nassehi "Multiple-Access Control for a Communication System with Order Pad Passing".

The first node (or station), in the following referred to as "Head", of each bus (node 0 for the A-bus and node N-1 for the B-bus) includes a Head function that may be activated, and when activated it will be referred to as being in Head-A state and Head-B state respectively. When the Heads are in Head-A or Head-B state they act as centralized points of control. They issue Reserve commands periodically, in which the nodes can request a number of slots of a cycle, and then place the accumulated requests into a Global Reservation Queue. In response to said reservations, cycles with the requested number of slots are created. The beginning and number of the cycle is identified by a Start command which is placed in the signalling part of the first slot of that cycle. Each node keeps track of its own reservations in a Local Reservation Queue, and utilizes the requested number of slots, when the corresponding cycle arrives.

There is a busy/empty and an arbitrated/unarbitrated indicator in each slot identifying the slot as being used or unused, and reserved or for free-use, respectively. Slots for free-use are issued when no requests are pending and can be accessed immediately i.e., without previous reservation. The slot format and the S-CRMA commands are shown in FIGS. 3 and 4. These slots are best suited for transmission of single-segment data, e.g. an ATM cell, since slot contiguity is not guaranteed.

Every node has a separate access machine for each bus and the access processes to the busses are independent. Therefore, in the following only access to the A-bus is described; that for the B-bus is completely symmetric.

CYCLE STRUCTURE

A super-cycle is defined as a group of $p=n+1$ (sub)cycles, with n being the smallest integer such that $2^n$ is greater or equal to the number of nodes N in the network. The (sub)cycles are numbered from 0 to C, where C is equal to the maximum supported cycle number, e.g., 255 with 8-bit cycle numbers. For example, with $N=200 \leq =2^8$ nodes there is $n=8$, and a super-cycle consists of $p=9$ (sub)cycles. In particular, the kth super-cycle consists of the (sub)cycles with the numbers $pk$, $pk+1, pk+2, \ldots, pk+n$ and the ith (sub)cycle has the cycle number $pk+i$.

RESERVATION PROCESS

The heads periodically poll all nodes via Reserve commands which can be issued at either Head-A or Head-B. Each Reserve command is identified by a bus-indicator, a cycle-number, and a priority. It furthermore contains a cycle-length and a maximum-length parameter, which both can be modified by the nodes. As the Reserve commands for the A-bus pass the nodes on the B-bus, each node is allowed to make one reservation per super-cycle. Which (sub)cycle to choose is determined by a function of the source and destination labels of the packet to transmit. (This is in contrast CRMA and CRMA/SR, where every node is allowed to make a reservation in each cycle). We propose a scheduling which is based on the bit-wise exclusive-or of the source and the destination node labels. Each station is in order to achieve this provided with EX-OR logic 14. This scheduling leads to a binary partitioning of the nodes into groups containing half, a quarter, an eighths, etc., of all nodes of the bus. In particular reservation takes place according to the following rules:

1. A node uses the ith (sub)cycle, i.e. makes a reservation for a cycle with a number $pk+i$, if the bit-wise exclusive-or of the packet's source node label and destination node label has a prefix consisting of $n-i$ zeros, followed by a one. The remaining bits are not considered.
2. All the multi-cast or broadcast packets are transmitted in the (sub)cycles with numbers pk, namely the first cycles of the supercycles.

In case of multiframe transmission, e.g. when many ATM cells with different destinations have to be transmitted, presorting of the packets by destination labels is recommended. When a node places a reservation for the ith (sub)cycle, it either over-writes or augments the cycle-length parameter in a reservation field 15 (FIG. 4) by the number of requested slots, according to the following rule:

A node overwrites the cycle-length parameter of the ith (sub)cycle if its label in binary representation ends with i zeros. All other nodes just augment the cycle-length parameter by the number of requested slots.

By this procedure a node is defined where reuse starts. i.e. a node where all arriving slots have already delivered their data to the respective destinations and can be reused, so that reservation can start anew (except for keeping the previous max. reservation).

The maximum-length parameter is only changed if the cycle-length value becomes larger. When the Reserve command returns to the head, its maximum-length parameter indicates the total number of slots required by the nodes for the corresponding (sub)cycle, i.e. the total number of slots necessary and sufficient for satisfying all reservations. The total number of slots requested, i.e. the sum of the requested number of slots may be higher than the necessary number. The head then enters a reservation, containing the cycle-number and maximum-length, into the Global Reservation Queue for the corresponding priority, and confirms the requests by issuing a Confirm command. If the requests cannot be handled, a backpressure mechanism is initiated. The queues are served by priority and according to a FIFO discipline.

DATA TRANSMISSION PROCESS

The headend unit 2 serves every reservation by creating a cycle 9 with the requested number of empty reserved slots 6. The first slot contains a Start command in the signaling field 7, that indicates the cycle-number. After observing a Start command, each node checks if there is an entry in its local reservation queue that matches with the cycle-number. If there is an entry for this ith (sub)cycle, the node uses the slots according to a function of its node label and of the (sub)cycle number:

1. If the node's label in binary representation ends with i zeros (indicating "start-of-reuse"), slots are used directly after the Start command and all remaining slots of the cycle are set to "empty" (i.e. they can be reused by downstream nodes).
2. If the node's label in binary representation does not end with i zeros, empty slots are used after the last "busy" slot of this cycle.

The binary partitioning for a network with $N=8$ nodes is depicted by FIG. 5, which shows the source and destination labels and the resulting EXOR-patterns, together with the (sub)cycle numbers of the kth super-cycle. Since there are not more than $2^3$ nodes, we need $n=3$ bits for the node labels, and there are $p=n+1=4$ (sub)cycles per super-cycle.

Transmission from source nodes to destination nodes with higher labels take place on the A-bus, as illustrated in the upper-right triangle of the matrix. The B-bus transmission rules are given in the lower-left triangle. FIG. 5 shows that the source node with label 000 always uses the A-bus. If it wants to transmit to node 001 it must make a reservation for a 1st (sub)cycle, i.e. for cycles with numbers $4K+1$. For transmissions to the two nodes 010 and 011 2nd (sub)cycles, i.e. cycles with cycle $4k+2$ must be used. The nodes 100, 101, 110, and 111, are reached in 3rd (sub)cycles, i.e. in cycles with numbers $4k+3$.

The scheduling for a specific traffic pattern is illustrated in FIG. 6. Here, there are 6 slots to be transmitted from node 0 to 2, 2 slots from 1 to 3, 5 slots from 2 to 3, etc., as indicated by the arrows on top of the nodes. The horizontal arrows under the nodes indicate which transmissions are allowed in which (sub)cycles, e.g., the 5 slots from 2 to 3 must be transmitted in (sub)cycle 1. The transmission of the 6, 2, 4, and 7 slots to the nodes 2, 3, and 7 must take place in (sub)cycle 2.

With the given traffic pattern, (sub)cycle 1 will be 9 slots long, (sub)cycle 2 will be 11 slots long, and (sub)cycle 3 will be 7 slots long. This leads to a total length of the S-CRMA super-cycle of 27 slots. The same traffic pattern leads to 40 and 20 slots, in CRMA and CRMA/SR, respectively. Note, although CRMA/SR gives a shorter cycle here, it would not be effective if there was just one broadcast message.

In S-CRMA a node can determine in which (sub)cycle it has to transmit a packet, by simply processing its own source and destination labels. There is no need to include the maximum-destination-label in the reservation command, like in CRMA/SR. Furthermore, the nodes do not need to keep track of a "reuse flag" and a node does not need information about other nodes' transmissions in order to decide if reuse is possible or not. Consequently, S-CRMA allows the reservations for a given bus to be made on the opposite bus, which improves delay performance. S-CRMA is not as adaptive as CRMA/SR, but it is simpler and it is effective for arbitrary traffic patterns.

In pure CRMA the average cycle length grows linearly with the number of nodes (for equally distributed traffic). In S-CRMA the corresponding (super-)cycle length seems to be a logarithmic function of the number of nodes.

We claim:

1. A communications network (1) comprising two unidirectional counterflowing transmission busses (4, 5), a plurality of stations (3) each connected to both busses and each station being identified by a label, and at least one headend unit (2) for generating time slots (6) on said busses (4,5), in which network the headend unit (2) comprises:
means for regularly releasing request poll messages, each identified by a cycle number, and containing at least one reservation field (11; 15),
means for issuing slots (6) in numbered cycles said slots being provided for transmitting data,
a global reservation (12) queue for storing access requests from the stations, and which network each station (3) comprises
a local reservation queue (13) for storing a value indicative of a number of locally requested slots and a cycle number for which the slots are requested, and wherein
each station is provided with means for requesting slot access by amending information in said reservation field (11; 15) in a passing request poll message; characterized by
means (14) in each station for logically combining by means of a predetermined logical function, a source station label (FIG. 5) and a destination station label (FIG. 5), for data to be transmitted,
means for deriving a first control number from a source station identification label and destination station identification label combination, such first control number corresponding to a particular cycle number; and
means in each station for identifying whether a passing request poll message carries a cycle number corresponding to said first control number, and upon matching, for amending the reservation field of said request poll message to reflect the number of requested slots for data to be transmitted.

2. Network as claimed in claim 1, wherein each request poll message contains a field (15) for inserting a length indicator representing the accumulated number of slots requested for the respective cycle, and wherein each station further comprises
means for deriving a second control number from its own node label, and comparing the cycle number of a request poll message to be used for requesting slots, with said second control number, to obtain a binary control value; and
means for requesting access to the transmission medium, either by
augmenting the length indicator in said request poll message by the number of slots required for transmitting said data, or
by overwriting the length indicator by the number of slots required for transmitting said message, and marking the respective station as starting station for slot reuse in the respective cycle.

3. Network as claimed in claim 1 or 2, comprising means in the headend unit for inserting in the first slot of a cycle, the number of that cycle and an indicator for the start of the cycle.

4. Network as claimed in claim 3 comprising means in each station for sensing said start indicator in a passing time slot, and in response to the presence of such indicator, checking in the local reservation queue for an entry matching the cycle number.

5. Network as claimed in claim 1, wherein the logical combining means is an EX-OR logic (14), and the first control number is taken as the number of '0' appearing before the first '1' of the result of the EX-ORing.

6. Method of regulating access to a looped unidirectional bus transmission system to which a plurality of stations identified by labels are connected, on which system data are transmitted in time slots which are released in numbered cycles by a headend unit, and in which said headend unit sends, for each of said cycles, a request poll message carrying the respective cycle number;
characterized by executing the following steps in any source station desiring to transmit data to a particular destination station:
logically combining by means of a predetermined logic function, for data to be transmitted, the source station label and the destination station label;
deriving a first control number from the logical combination of the source station label and the destination station label;
using, for requesting slots in which to transmit said data, only a request poll message carrying a cycle number which corresponds to said first control number; and
subsequently transmitting said data in slots of a cycle whose number corresponds to said first control number.

7. Method as claimed in claim 6, wherein each request poll message contains one field for a length indicator representing the accumulated number of slots requested for the respective cycle, and wherein the following steps are executed by a station which has data to transmit:
deriving a second control number from its own station label, and comparing the cycle number of a request poll message to be used for requesting slots, to said second control number, to obtain a binary control value; and
for requesting access to the transmission medium, in dependence of said binary control value, either
augmenting the length indicator in said request poll message by the number of slots required for transmitting said data, or
overwriting the length indicator by the number of slots required for transmitting said data, and marking the respective station as staffing station for slot reuse in the respective cycle.

8. Method as claimed in claim 6 or 7, comprising performing the following steps:
in the headend unit, inserting in the first slot of a cycle, the number of that cycle and an indicator for the staff of the cycle;
in each station, sensing said staff indicator in a passing time slot, and in response to the presence of said indicator, checking in the local reservation queue for an entry matching the cycle number.

9. Method as claimed in claim 7, wherein said each request poll message is issued as a reserve command comprising a plurality of fields transmitted in a plurality of consecutive slots.

10. Method as claimed in claim 6, wherein the step of logically combining labels in each node is effected by performing in each node an EX-ORing of the labels of the source station and the destination station respectively, and taking said control number as the number of '0' appearing before the first '1' of the result of the EX-ORing of said labels.

* * * * *